United States Patent

Jenkins

[15] 3,645,539

[45] Feb. 29, 1972

[54] DELAY LOOP TAPE CARTRIDGE

[72] Inventor: John Paul Jenkins, Towanda, Ill.

[73] Assignee: Harris-Intertype Corporation, Cleveland, Ohio

[22] Filed: Mar. 19, 1969

[21] Appl. No.: 808,584

[52] U.S. Cl. ..........................274/4 B, 242/186, 242/55.19 A

[51] Int. Cl. ....................................G11b 25/06, G11b 23/06

[58] Field of Search .......................274/4 R, 11 R, 4 BC, 11 B, 274/11 C, 11 E; 242/55.19 A, 186, 189, 190; 179/100.2 RE; 35/35 C

[56] References Cited

UNITED STATES PATENTS

| | | | |
|---|---|---|---|
| 2,729,454 | 1/1956 | Vides | 179/100.2 RE UX |
| 3,118,235 | 1/1964 | Ley | 35/35 C |

FOREIGN PATENTS OR APPLICATIONS

| | | | |
|---|---|---|---|
| 245,155 | 0/1960 | Canada | 179/100.2 RE |

*Primary Examiner*—Leonard Forman
*Assistant Examiner*—Dennis A. Dearing
*Attorney*—Hill, Sherman, Meroni, Gross & Simpson

[57] ABSTRACT

A tape delay cartridge device having a continuously moving closed loop of magnetic tape passing adjacent to a record head and subsequently adjacent to a playback head. A secondary loop of the tape is formed between the record head and the playback head such that there is an excess of length therebetween. This excess of length or loop provides a delay in the playback of information recorded by the record head. In this way, information being recorded can be continuously monitored, and the tape can be stopped before any bit of information reaches the playback head to delete certain portions thereof such as may be required in censoring telephone conversations or the like which are to be broadcast "live." The delay loop may be of a variable length in that the magnetic tape is wound a plurality of times around a reel prior to passing adjacent to the playback head. A flywheel is provided to stabilize the motion of the tape as it passes from the record head to the playback head through the delay reel and loop assembly. The entire magnetic tape takes the form of a closed loop, and it is wound about a storage reel which may include any variable length of the magnetic tape thereby providing a long tape and avoiding the splice problems associated with a small closed loop wherein the splice passes beneath the playback head in rapid succession.

6 Claims, 1 Drawing Figure

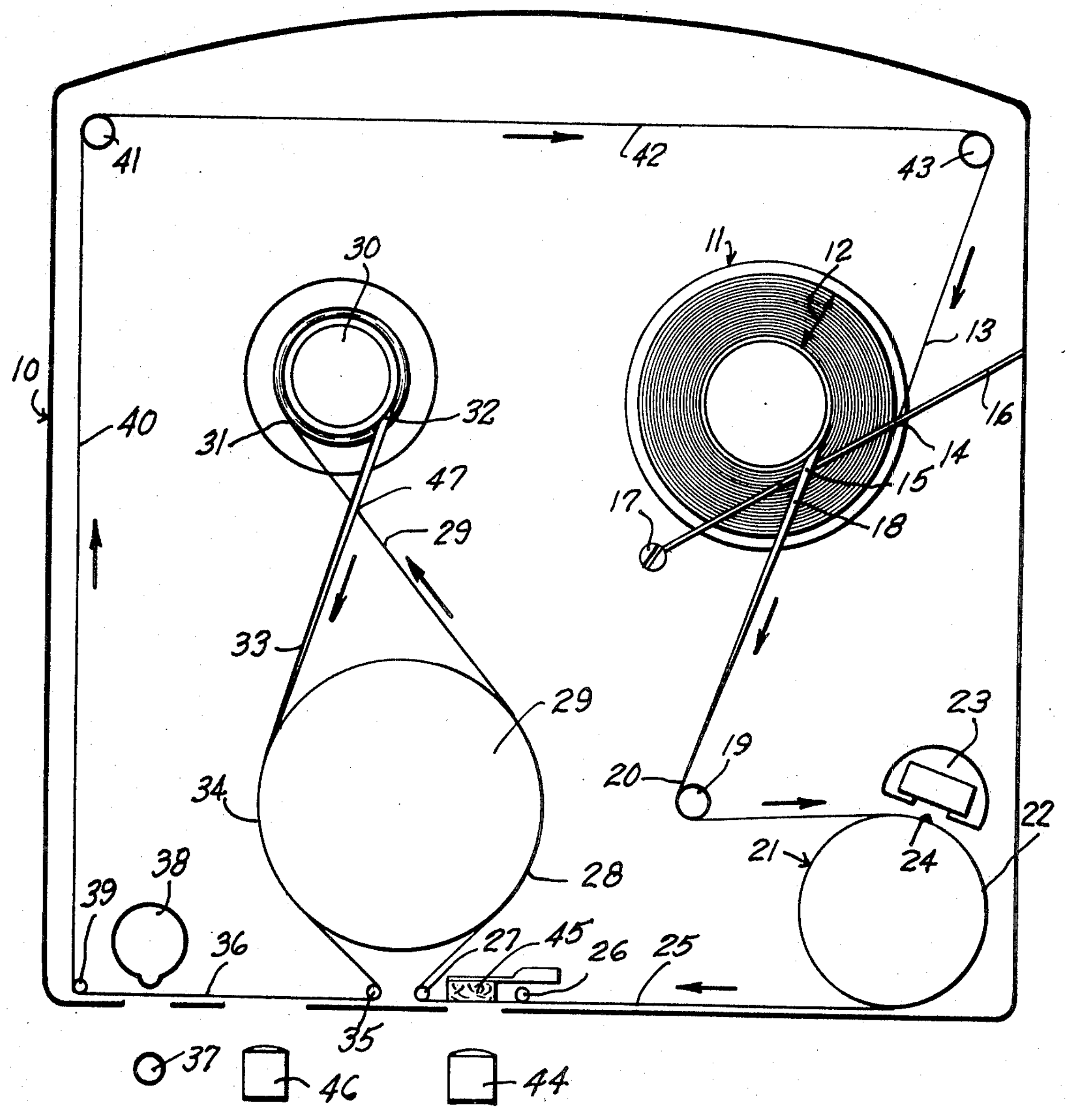
*INVENTOR.*
John Paul Jenkins
Hill, Sherman, Meroni, Gross & Simpson
*BY* *ATTORNEYS*

DELAY LOOP TAPE CARTRIDGE

BACKGROUND OF THE INVENTION

Field of the Invention

The field of art to which this invention pertains is magnetic recording and playback devices for tape cartridges and in particular to devices for censoring information which is being broadcast "live." The present invention relates to a tape cartridge device having a closed loop and having continuously operative record and playback heads with a secondary loop of material provided between the heads to allow for a suitable delay between the recording and the playing back of the information on the tape.

SUMMARY OF THE INVENTION

It is an important feature of the present invention to provide a magnetic tape cartridge incorporating a delay between the recording and playing back of information.

It is another feature of the present invention to provide an improved magnetic tape cartridge.

It is an important object of the present invention to provide a cartridge for incorporating a delay in the recording and playing back of information on a magnetic tape wherein a loop of the magnetic tape is formed between the record and playback heads thereof.

It is also an object of the present invention to provide means for stabilizing the travel of a magnetic tape in a secondary loop formed between the record and playback heads.

It is a further object of the invention to provide a flywheel and tape guide arrangement for a delay loop in a magnetic tape cartridge to stabilize the flutter in the tape loop between the record and playback heads.

It is an additional object of the present invention to provide a magnetic tape device which includes a cartridge having a storage reel and a continuous closed-loop magnetic tape wound about the storage reel and extending in a loop around the cartridge and wherein a secondary loop is formed between the point of recording and point of playback on the tape as it moves in its path of travel.

It is still another object of the present invention to provide a flywheel which is located between the record-playback heads and a subsidiary delay storage reel of a delay loop tape cartridge wherein the flywheel has a larger diameter than the associated spacing of guide members which hold the magnetic tape in its path of travel adjacent to the record and playback heads.

These and other objects, features and advantages of the present invention will be understood in greater detail from the following description and the associated drawings wherein reference numerals are utilized to designate an illustrative embodiment.

BRIEF DESCRIPTION OF THE DRAWING

The single sheet of drawings in the present application shows a schematic of a tape cartridge and illustrates the path of travel of a magnetic tape as it moves from the point of recording at a record head around a fly wheel and a subsidiary storage reel to the point of playback adjacent to a playback head. The single sheet of drawings also shows the closed endless loop formed by the magnetic tape and includes a larger or principal storage reel as well as the subsidiary storage reel which is used to form the delay loop between the record and playback heads.

DESCRIPTION OF THE PREFERRED EMBODIMENT

It may be desirable in radio broadcasting or in other similar applications to provide a delay between the actual occurrence of statements to be broadcasted and the time of broadcasting those statements. This is true in so-called "live" broadcasting.

For example, if the radio announcer is interviewing persons by telephone it may be desirable to censor statements made on the telephone.

The present invention provides a means to prevent the broadcasting of information which has occurred only seconds earlier. This takes the form of a magnetic tape cartridge which includes record and playback heads. The record head records the information to be broadcast and stores this information on a given length of magnetic tape to play back the information at a later time interval which may be in the order of a few seconds or a few minutes. Accordingly, by providing an excessive length of tape between a record and a playback head a delay which is directly related to the length of the tape can be incorporated in the tape system.

According to the present invention, a secondary or subsidiary loop is formed between the record and playback heads. Furthermore, this loop is not simply a single loop of tape but is a substantial length of tape which is wound a plurality of times about a delay reel.

It is important that the tape move at a uniform speed between the record and playback positions, and with a large quantity of tape in an extensive loop between the record and playback heads, flutter of the tape can be expected.

Accordingly, the present invention provides a flywheel which bears against the tape movement both to and from the subsidiary or secondary storage reel thereby stabilizing the tape movement and providing a uniformly desirable response at the playback head. In order to assure that the flywheel performs its function, a pair of tape guides are spaced adjacent to each other and the tape from the guides flares outwardly to provide a substantial degree of wrap around the periphery of the flywheel.

The magnetic tape itself takes the form of a closed loop and is wound about a main storage reel which provides a substantial length of tape in the cartridge. It is desirable to have a substantial length of tape in the cartridge; otherwise the splice between the ends of the tape forming the continuous or closed loop would pass beneath the record and playback heads frequently, thereby causing undesirable responses at the playback head.

In the tape cartridge according to the present invention, information is recorded at one point in the loop, then a delay is provided between a recording point and a playback point. The tape then continues to travel through the storage reel to an erase point in the cartridge. At this point, the tape information is removed, and the tape is returned to the record point. The tape of the present invention is not designed to store information, but is merely designed to provide an interval of time between the recording of information and the broadcast of that information. Once that information is cleared for broadcast it is unnecessary to retain the information further. Accordingly, the information is erased, and the tape is continuously useable in this way as a tape monitoring system. Additional flywheels may be used in the tape loop system to stabilize the tape travel, thereby assuring that the playback information is an accurate reproduction.

Referring to the drawings in greater detail, a frame 10 is shown which is the tape cartridge casing and which holds the series of reels and flywheels described above.

A principal storage reel 11 is rotatably mounted on the frame or casing 10 as shown and provides for the storage of a large quantity 12 of magnetic tape. A portion 13 of a closed loop of magnetic tape enters the storage reel 11 at a point 14 and leaves the storage reel at a point 15 as is well understood in the art. A lift guide 16 is provided to lift a portion of the tape 18 away from the upper surface of the storage reel 11. The lift guide 16 is secured to the frame or casing 10 by a setscrew 17.

It is understood that in a closed-loop system, the so-called endless tape must be spliced at least one point along its length. This splice causes a blip or an interference at the playback point. Normally this splice is not noticeable if it occurs at irregular and long intervals. However, if the splice is repetitive at frequent intervals, it becomes noticeable and undesirable. By providing the principal storage loop 11, the substantial mount of tape shown at 12 prevents the splice from passing beneath the playback head at frequent intervals. It is apparent that this splice will pass beneath the playback head only after the tape has passed through one complete revolution which includes unreeling all of the tape on the storage reel 11.

Also, if a short closed loop of tape were provided, not only would there be an undesirable effect from the frequent passing of the splice beneath the playback head, but also the tape would tend to wear quickly due to the repetitive use of the tape against the record and playback heads and due to the pressure applied to the tape by the capstan. By providing a large quantity of tape such as shown at 12 about the storage reel 11, any one portion of the tape passes against the record and playback heads and the driving capstan less frequently than would otherwise occur. Accordingly, the use of the storage reel 11 substantially increases the life span of the entire delay loop tape cartridge.

The magnetic tape passes from the point 15 to and around a roller 19 as shown at 20. The roller 19 guides the tape to the vicinity of a flywheel 21. The flywheel 21 is rotatably mounted as shown, and the tape is guided around the flywheel as at 22 so that the angle of wrap about the flywheel is in the order of 180 degrees. A magnet 23 is positioned adjacent to a portion 24 of the tape at the flywheel 21 and effectively erases information on the tape.

The tape then passes from the flywheel 21 along a path 25 against shape guides 26 and 27. The tape passes around the tape guide 27 or flares outwardly as at 28 to wrap around a further flywheel 29.

The tape passes along a path of travel 29 to a subsidiary or delay reel 30. The reel 30 is an endless loop reel which is designed so that the tape is wound on the outside of the spool and is withdrawn from the inside of the spool immediately adjacent to the hub. The tape enters the reel 30 at a point 31 and exits from the reel at a point 32 similar to the case of the principal storage reel 11. The reels 11 and 30 are well known in the art, and their operation does not require detailed discussion.

It suffices to say that the tape exits from the reel 30 at the point 32 and passes along a further path 33 to and against the fly wheel 29 as at a point 34.

The tape then passes to and around a further guide 35 making approximately a 315° angle and travels along a course 36 to and between a capstan 37. A pinch may be used in conjunction with a capstan 37 to drive the tape.

The tape the passes at right angles about a further guide 39 and along a path of travel 40 to a roller 41. Again the tape path of travel takes a right angle and extends along a direction indicated generally as at 42. Finally, the tape passes about a further roller 43 and returns as at 13 to the principal or main storage reel 11 to enter the reel as at 14. Accordingly the tape is a closed endless loop which incorporates not only the storage reel 11 but also a subsidiary or delay reel 30.

A record head 44 is shown adjacent to the tape and cooperates with a pressure pad 45. The pressure pad moves the tape against the record head, and in this way information is recorded on the tape and fed through the subsidiary or delay loop provided by the flywheel and the subsidiary storage reel 30.

A playback head 46 is shown adjacent to the record head and may be moved into proximity with the magnetic tape to play back information on the tape for broadcasting purposes. It is apparent that due to the quantity of tape between the point of recording and the point of playback a considerable delay will exist before playback of recorded information. This delay can be used advantageously to censor or select material which has been recorded prior to playback.

It is noted that the guides 27 and 35 are spaced substantially adjacent to each other, and that the tape path flares outwardly from the guide to the much larger diameter of the flywheel 29. This provides for a greater degree of wrap of the tape about the flywheel. Also, it is to be noted that the tape crosses its own path in its travel to and from the subsidiary or delay reel 30. This occurs at reference numeral 47. This also provides for a greater degree of wrap about the larger flywheel 29. In this way flutter or other instabilities in the travel of the tape from the guide 27 to the guide 35 can be eliminated.

The other flywheel 21 also eliminates instabilities in the tape movement which may be associated with the take up and dispensing of tape from the storage reel 11.

As explained, information on the tape is not retained, but is erased at the magnet 23, and accordingly a fresh portion of the tape is presented to the record head 44 immediately following the magnet 23 in the path of travel of the tape as shown in the drawing.

It is apparent that the tape cartridge device of the present invention provides an effective delay between the recording and playing back of information on a magnetic tape and furthermore provides the detailed mechanical assembly required to make the tape drive system a practical device.

I claim as my invention:

1. A delay tape cartridge device comprising:

a cartridge frame, a record head and a playback head disposed in fixed relation to said frame and being spaced apart, a magnetic tape having the form of a closed endless loop, means for passing the tape against both the record and playback heads, an endless loop reel mounted for rotation in said cartridge frame, a delay loop being formed in the length of tape which extends between the record and playback heads by a plurality of windings of the tape around said endless loop reel such that the length of tape extending between the heads is substantially greater than the straight line distance therebetween, and means moving the tape in a direction from the record head, to and around the endless loop reel and from the endless loop reel to the playback head.

2. A delay tape cartridge in accordance with claim 1 wherein a flywheel is rotatably mounted on said frame and wherein the tape which is wound on said delay loop reel is passed against said flywheel, thereby stabilizing the movement of the tape from the record head to the playback head.

3. A delay tape cartridge in accordance with claim 2 wherein a second reel is provided on said frame and wherein said closed loop of tape is wound a plurality of times around said second reel, thereby providing a variable length closed loop apart from and in addition to the variable length of the delay loop reel.

4. A delay tape device comprising:

a cartridge frame having guide means for guiding a closed loop of tape in continuous travel thereon, playback and record heads spaced apart and positioned in fixed relation to said cartridge frame, an endless loop delay reel rotatably positioned on said cartridge frame, a closed loop of tape supported by said guide means and forming a continuous path of travel, a delay loop formed in the tape by a plurality of windings around the endless loop delay reel, said path of travel being adjacent to both said record and playback heads and around said delay reel, a flywheel rotatably positioned between the record and playback heads and the delay reel, means causing the closed loop of tape to pass from a point adjacent to the record head to and against the flywheel, around the delay reel and to a point adjacent to the playback head, and said tape having a substantial frictional engagement with said flywheel.

5. A delay tape cartridge device in accordance with claim 4 wherein the tape passes against the surface of the flywheel both in its travel from the record head to the delay reel and in its travel from the delay reel to the playback head.

6. A delay tape cartridge device in accordance with claim 5 wherein first and second of said guide means are positioned intermediate said record and playback heads and wherein said flywheel has a diameter which is greater than the spacing between said first and second guide means thereby causing the path of travel of the tape to flare outwardly from said guide means to allow a greater degree of wrap of the tape about said flywheel.

* * * * *